United States Patent

[11] 3,620,611

[72] Inventors George B. Parrent, Jr.
Carlisle;
Peter F. Mueller, Concord, both of Mass.
[21] Appl. No. 705,771
[22] Filed Feb. 15, 1968
[45] Patented Nov. 16, 1971
[73] Assignee Technical Operations, Incorporated
Burlington, Mass.

[54] APPARATUS AND METHODS FOR DISPLAYING OR VIEWING EDUCATIONAL MATERIALS OR THE LIKE
1 Claim, 11 Drawing Figs.
[52] U.S. Cl. ................................................. 353/20,
35/53, 350/162 SF, 353/25, 353/30, 353/84,
353/97
[51] Int. Cl. ................................................. G03b 21/14,
G03b 21/26
[50] Field of Search ........................................... 350/162,
162 SF; 353/20, 25, 30, 31, 32, 34, 35, 84, 120,
121, 122; 355/40; 352/42, 66, 67, 81; 178/6.7, 5.4
BD, 5.4 CF; 340/73

[56] References Cited
UNITED STATES PATENTS
Re. 20,748 6/1938 Bocca .................. 350/162

OTHER REFERENCES
J. D. Armitage et al., Theta Modulation in Optics, Applied Optics, Vol. 4, No. 4, April 1965, pp. 399– 403

Primary Examiner—Leonard Forman
Assistant Examiner—Steven L. Stephan
Attorneys—Alfred H. Rosen and John H. Coult ABSTRACT: This disclosure depicts apparatus and techniques for selectively retrieving one or a selected combination of images stored in additive superposition on a photostorage record. As an example of a useful implementation of the invention, there is disclosed an educational display device for use in instructing nurses, doctors, medical technicians, and so forth, on the human physiology. On a single record, images of a number of anatomical systems are recorded in additive superposition, the images being selectively retrievable at the option of the operator to enable the component systems to be viewed individually, or to be overlaid in selected combinations to show physiological or other relationships between the various systems.

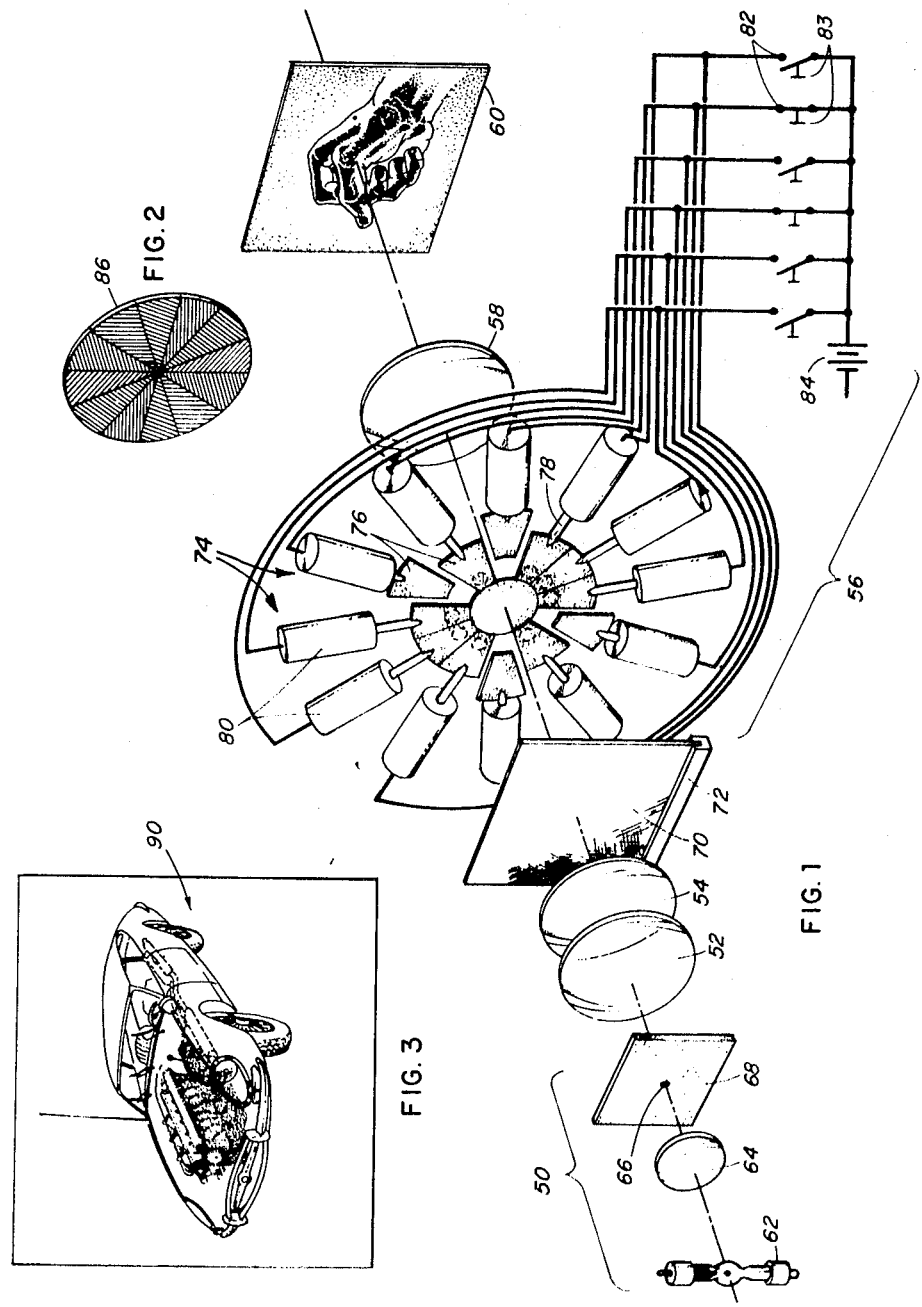

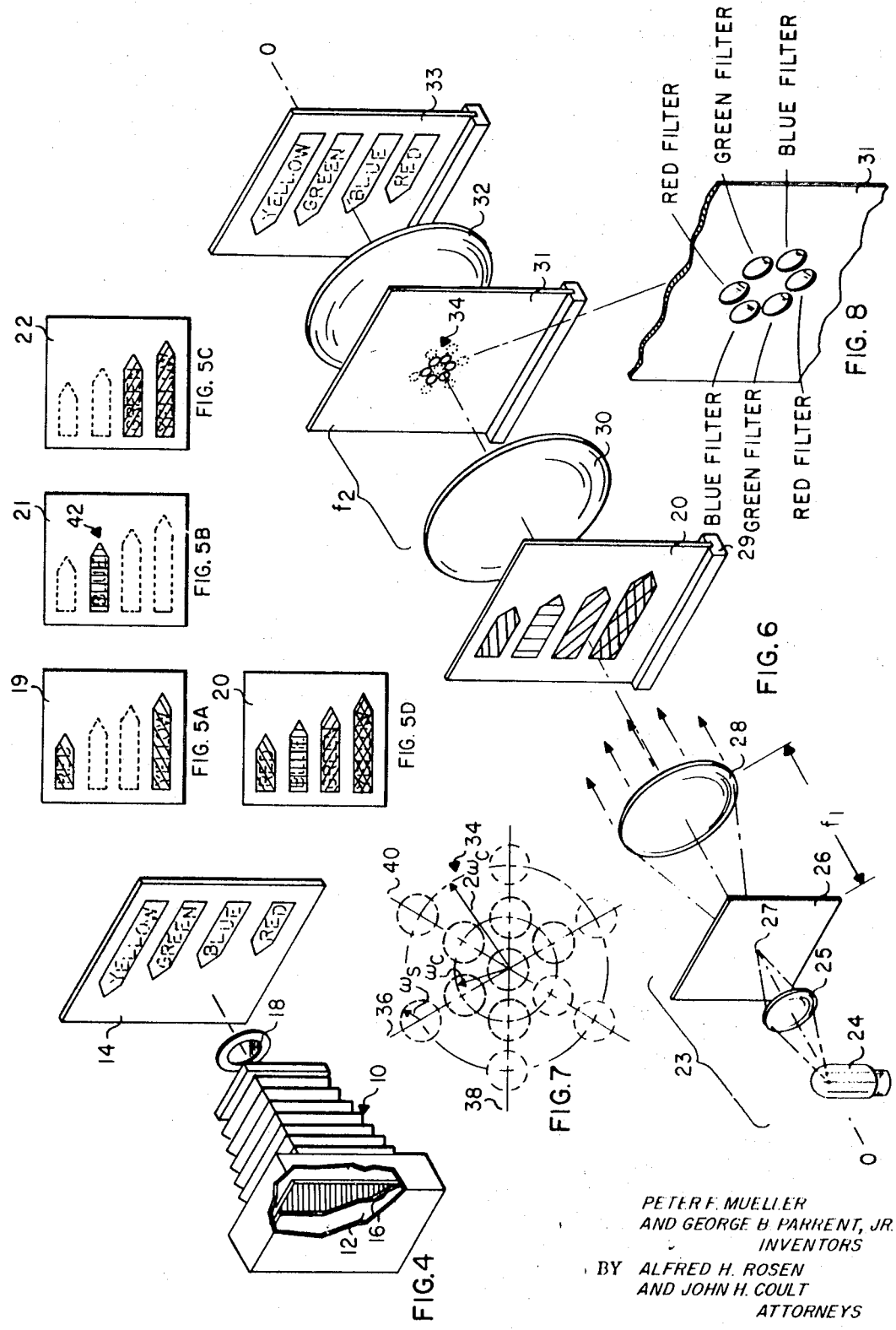

APPARATUS AND METHODS FOR DISPLAYING OR VIEWING EDUCATIONAL MATERIALS OR THE LIKE

CROSS-REFERENCE TO RELATED APPLICATION

The subject matter of this application relates to, but is not dependent upon, copending application, Ser. No. 510,807, filed Dec. 1, 1965 now U.S. Pat. No. 3,425,770.

BACKGROUND OF THE INVENTION

It is desirable in many teaching applications or the like to visually show a geometrical, physiological, or other relationship between subsystems or substructures which interact or otherwise combine to make up a composite structure or system. For example, it would be useful in the understanding of the operation and structure of an internal combustion engine to be able to visualize the cooling system, the lubrication system, the power train, and other subsystems individually, in selected subcombinations, and finally in an integrated overlay. Using this technique, the learning process is enhanced by the student's ability to visualize and understand the interrelationships between the various substructures and subsystems.

To use prior art techniques, a number of photographic transparencies might be made each containing an image of one of the subsystems or substructures of a composite structure desired to be studied. A number of projectors might then be employed to project in superposition upon a display screen the individual subsystems or substructures whose interrelationships are sought. This technique has a serious drawback, however. It is very difficult to effect the exact registration of the overlaid images which is necessary to show the exact relationship between the displayed subelements. In addition, this technique involves a considerable investment in projection equipment, and is quite cumbersome in operation, even after image registration has been achieved. Further, the composite of the retrieved images cannot be viewed directly, but must be displayed with a high output projector and a screen.

Alternatively, one might attempt to display more than one of such transparencies in a single projector; however, only one, or no more than a very small number of transparencies could be brought into focus on the display screen at any one time.

OBJECTS OF THE INVENTION

It is an object of this invention to provide methods and apparatus especially useful in displaying educational materials or the like, for enabling a relatively large number of different images to be stored on a single composite record and then retrieved for viewing or display either individually or in any selected combination.

It is another object of the invention to provide display apparatus and methods for overlaying two or more separately retrieved images for viewing or display in which exact registration of the retrieved images is achieved automatically.

It is yet another object of the invention that the retrieval of one or more component images from such a composite record in any desired combination of images can be accomplished easily and rapidly.

BRIEF DESCRIPTION OF THE DRAWINGS

For a fuller understanding of the invention reference may be had to the following detailed description taken in connection with the accompanying drawings wherein:

FIG. 1 is a distorted scale schematic perspective view of a preferred form of display apparatus embodying the principles of our invention;

FIG. 2 is a view of a sectored color filter which may be incorporated into the FIG. 1 embodiment to effect a color coding of retrieved images;

FIG. 3 is a representation of a typical composite display which might be produced using an optical system such as shown in FIG. 1 to retrieve and overlay a selected combination of component images stored on a composite storage record;

FIG. 4 is a distorted scale schematic perspective view of a colored object and a photographic camera which might be used for forming carrier modulated color separation records of the object; the view shows the camera partially broken away to reveal photographic recording material and a diffraction grating which would be otherwise hidden within the interior of the camera;

FIGS. 5A–5D show individual and composite color separation records of the photographed object, each of the individual records being associated with a particular zone of the visible spectrum and with a periodic modulation distinctive by its relative angular orientation;

FIG. 6 is a distorted scale schematic perspective view of prior art projection display apparatus for displaying photographic records of the above described type;

FIG. 7 is a schematic view of a Fraunhofer diffraction pattern which might be formed by the FIG. 6 apparatus; and FIG. 8 is a schematic perspective view, enlarged and broken away, of a spatial filter shown in FIG. 7.

DESCRIPTION OF THE PREFERRED EMBODIMENTS

FIGS. 1–3 are useful in understanding ways by which the inventive concepts may be put into structural form. However, before entering into a discussion of the Fig. 1 embodiment and the other possible embodiments suggested thereby, a brief discussion of the general nature of the information storage and recovery techniques with which this invention is involved, and the nature of the problems which exist in prior art techniques, will be first engaged.

FIG. 4 shows in very schematic form a photographic camera 10 which might be employed to form a spectral zonal spatially periodically modulated photographic record. The record may be formed as a composite of three separate color separation exposures of a photosensitive film 12 in the camera 10. The separate color separation records thus formed are respectively associated with a spatial periodic modulation, imposed, for example, by a diffraction grating 16 adjacent the film 12, which is unique in terms of its relative azimuthal orientation.

FIG. 4 depicts the first step of a multistep operation for forming such a composite record. An object 14, illustrated as having areas of predominantly yellow, green, blue, and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxtaposed with the film 12 to effect a superposition of a shadow image of the grating 16 on the red light image of object 14. The resulting color separation record 19 associated with the red content in the object 14, processed to a positive, for example by reversal processing techniques, would appear as shown in FIG. 5A. It is seen from FIG. 5A that the grating modulation is superimposed upon the object detail associated with light having a red spectral content. Note that because of the red constituent of yellow light, the yellow area in the object 14 is also imaged with superimposed grating lines of like angular orientation.

To complete the formation of a composite photographic record, as shown in FIG. 5D at 20, color separation exposures are then made successively through a filter having a spectral transmittance characterized by a blue dominant wavelength with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 5B that the blue color separation record 21 does not result in the exposure of any part of the film 12 not associated with blue content in the object 14; however, on exposure to the object 14 through a green filter, the yellow area is again exposed with grating image superimposed thereon with an orientation associated with the green color separation record 22. Thus, as shown in FIG. 5D, the object area having yellow spectral content has superimposed thereon spatially periodic modulations associated with both the red and green color separation records.

Apparatus for displaying such a photographic record is known to the prior art and may take the form shown in FIG. 6. Such display apparatus includes a source 23 of at least partially coherent light, illustrated as comprising an arc lamp 24, a condenser lens 25, and a mask 26 having an aperture 27 of restricted diameter. A lens 28 is provided for effectively transporting the point light source formed to a far field, either real or virtual. A film holder 29 for supporting a transparency record to be displayed, a transform lens 30 (explained below), a Fourier transform filter 31 (explained below), a projection lens 32, and a display screen 33 complete the display apparatus.

Upon illumination of a transparency record, such as composite record 20 in film holder 29, as a result of diffraction and interference phenomena and the relative angular displacement between the periodic modulations respectively associated with the color separation records 19, 21, and 22, three angularly displaced multiorder diffraction patterns, collectively designated by reference numeral 34, will be produced, as shown, for example, in the schematic illustration in FIG. 7. Each of the separate diffraction patterns associated with a separate color separation record comprises a zeroth order which is spatially coextensive with the zeroth order (undiffracted) components of each of the other patterns, and a plurality of higher order (diffracted) components representing a Dirac delta function array convolved with a spatial frequency spectrum characterizing the particular color separation record.

By the use of transform lens 30 these diffraction patterns are formed a focal length from the lens 30 in a space commonly known as the Fourier transform space. It is thus termed because of the spatial and temporal frequency analysis which is achieved in this space by the described diffraction and interference effects. Through the use of spatial and spectral filtering of these patterns in the transform plane, one or more of the discrete records may be displayed, for example, to achieve a reconstitution of the original scene in true or selectively distorted color.

The nature of the Fourier transform space and the effects that may be achieved by spatial filtering alone or by spatial and spectral filtering in this space of a selected diffraction order or orders may be understood by reference to FIG. 7. FIG. 7 shows three angularly separated diffraction patterns corresponding to the red, green, and blue light object spatial frequency spectra lying along axes labeled 36, 38, and 40 respectively. Each of the axes 36, 38, and 40 is oriented orthogonally to the periodic modulation on the associated color separation record. The diffraction patterns share a common zero order location but have spatially separated higher orders.

By the nature of diffraction phenomena, the diffraction angle $\alpha$ is: $\sin \alpha = \lambda \omega$  (1)
where $\lambda$ represents the spectral wavelength of the illumination radiation and $\omega$ represents spatial frequencies. Assuming the light at the film gate 29 to be collimated (although this is not a necessary condition) the diffraction orders will be formed in the transform space at the delta function positions determined by the transform of the record modulation at radial distances from the pattern axis:

$$R = f_t m \omega_c \bar{\lambda} \quad (2)$$

where $f_t$ is the focal length of lens 30; $\bar{\lambda}$ is the mean wavelength of the illuminating radiation; $m$ represents the diffraction order; and $\omega_c$ is the fundamental grating frequency.

The first orders of each of the diffraction patterns can be considered as being an object spatial frequency spectrum of maximum frequency $\omega_s$ (representing a radius of the order) convolved with a carrier of spatial frequency $\omega_c$. The second order components can be thought of as being the convolution of an object spectrum having a maximum spatial frequency $\omega_s$ with a carrier having a spatial frequency of $2\omega_c$, and so forth.

Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are present, but will be of increasingly less intensity.

Spatial filtering of the diffraction pattern is achieved by placing the apertured transform filter 31 in the transform space, as shown in FIG. 6. Since the zeroth order components of the diffraction patterns are spatially coextensive, the spatial frequencies contained in the zeroth order information channel represents the sum of the spectra respectively associated with each of the color separation records, 19, 21, and 22. Thus an opening in the transform filter 31 at the zeroth order location would result in a composite image of object 14 being formed in black, white, and tones of grey. Because the information channels associated with each of the color separation records are inseparably commingled in the zeroth order, they cannot be properly recolored to effect a faithful color reproduction of the photographed object. However, at the higher orders, because of the angular displacement of the red, blue, and green-associated axes 36, 38, and 40, the proper spectral characteristic may be added to each of the information channels by appropriate spectral filtering.

FIG. 8 represents an enlargement of a central portion of filter 31, illustrating appropriate spatial filtering apertures with the correct spectral filters to effect a true color reproduction of the object. It should be understood, of course, that higher order components, appropriately spectrally filtered, could also be passed, if desired. However, to maintain the discussion at a fundamental level, utilization of only the first order diffraction components has been illustrated.

Consider now a trance of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 collects the substantially planar wave fronts in the zeroth order and diffracted higher orders and brings them to a focus in transform space in or near the aperture of the projection lens 32. The lenses 28 and 30 may be thus thought of as cooperating to image the illuminated aperture 27 in mask 26 on the transform filter 31.

The above-described photostorage and retrieval technique has been described in connection with the storage and retrieval of color separation information. However, we have discovered methods and apparatus by which a large number of different scene images may be additively superimposed on the same area of a photostorage medium and yet separately retrieved by spatial filtering techniques. This invention is described and claimed in application, Ser. No. 510,807, filed Dec. 1, 1965 now U.S. Pat. No. 3,425,770.

We utilize this discovery as the way by which a multiplicity of images of different subcomponents or subsystems are recorded in superposition on a single composite photostorage record. Utilizing the teachings of the present invention, any one or any combination of the component record images may be retrieved by a simple manual selection process.

FIG. 1 illustrates schematically a system embodying the principles of this invention, comprising a light source means 50 for forming a relatively intense effective point light source, a collimating lens 52, a transform lens 54, detection apparatus 56, and a projection lens 58 for projecting selectively retrieved images on a display screen 60.

In more detail, the light source means 50 is illustrated as comprising an arc lamp 62 providing an intense source of luminous energy which is imaged by a condensing lens 64 upon an aperture 66 of restricted size in a mask 68. With such a light source arrangement a small source (hereinafter termed a point source) of relatively intense visible radiation is produced.

The collimating lens 52, preferably disposed approximately a focal length away from the mask 68, produces a substantially collimated beam of light directed into the transform lens 54. Light emanating from the transform lens 54 illuminates a composite record 70 located in a film gate 72. The collimating lens 52 and the transform lens 54 cooperate to form an image of the effective point source formed at mask 68 substantially at the rear focal plane of the transform lens 54 in a space termed the Fourier transform space in which appears a Fraunhofer diffraction pattern of the light transmission function at the record 70.

As described above, the composite record 70 comprises a number of component record images stored in superposition, each component record image modulating a spatial carrier whose direction vector is azimuthally distinct from the direction vectors of the carriers associated with each of the other component images. In the Fourier transform space there is produced a Dirac delta function associated with each of the spatial carriers, each delta function having an azimuthal orientation related to the direction vector of the respective carrier. Each of the delta functions in convolved with a spectrum of spatial frequencies characterizing the component record image modulating the associated carrier. Thus a diffraction pattern is formed which is similar to that shown in FIG. 7, but which has a number of delta function distributions equal to the number of carrier-modulated component record images stored on the composite record 70. The FIG. 1 embodiment is illustrated as being adapted to function with a composite record having six component images stored thereon. This number is entirely arbitrary, however, and a greater or fewer number of component images may be stored and retrieved, as desired, as described in our above-identified copending application.

By this invention, one or any selected combination of the six component record images may be simultaneously retrieved for viewing or display by selectively transmitting through Fourier transform space the first harmonic diffraction orders characterizing the component record image or images desired to be retrieved. To this end, we show as one way of selectively passing the desired diffraction spectra, six pairs of adjustable spatial filter devices 74. Each of the devices 74 comprises an opaque wedge-shaped filter plate 76 connected to the plunger 78 of a solenoid 80 for radial reciprocation by the solenoid 80 upon command from a central location. Diametrically opposed pairs of the devices 74 are electrically connected and jointly controlled through an array of six selection switches 82 manually operable by an array of six switch operators 83. The opposing switch terminals are connected to a source of electrical power, here represented schematically by battery 84. It is evident from the above discussion that to effect retrieval of one or any combination of the record component images, in automatic self registration, the operator merely actuates the corresponding one or more switch operators 83.

A projection lens 58 and display screen are shown as one way by which the retrieved component record images may be viewed. Alternatively, the projection lens and screen may be removed, and the retrieved images viewed directly with the eye located on the optical axis in the general position of the lens 58.

Thus, we have shown in schematic form one of the many possible devices and methods which might be devised to carry out our teachings. The illustrated embodiment thus functions to illustrate the manner in which any one or desired combinations of record images may be retrieved and viewed or displayed in overlying relationship by the mere operation of the appropriate combination of selection switches 82.

As a further aid to the student, the retrieved component record images may be color-coded to facilitate distinction therebetween in the composite displays. Such a color coding may be accomplished by locating a sectored spectral filter 86 immediately behind the spatial filter devices 74. The spectral filter 86 comprises twelve (six diametrically related pairs) of spectral filters each having a peak transmittance in a different region of the visible spectrum. Utilizing such a spectral filter 86, it is evident that the transmitted spatial frequency spectra of the component record images being retrieved are filtered upon passing through the spectral filter 86 and thus are retransformed in light having the wavelength characteristic of the associated spectral filter.

There is shown on screen 60 a composite display which might be useful in the instruction of nurses, doctors, and other persons interested in medical technology. The display comprises an image of a human hand, an overlaid in superposition and in self-registration thereon an image of the bone structure of the hand and fingers. It is evident that many other physiological systems might be added in various combinations as a useful learning aid to the medical technology student.

FIG. 3 shows an alternative application useful in the instruction of students of automotive repair. FIG. 3 represents a three component overlay comprising separately retrievable images of an automobile chassis, an internal combustion engine with the chassis, and the exhaust system of the engine.

The invention is not limited to the particular details of construction of the embodiments depicted and it is contemplated that various and other modifications will appear to those skilled in the art. Certain changes may be made in the above-described apparatus without departing from the true spirit and scope of the invention herein involved, and it is therefore intended that the subject matter of the above depiction may be interpreted as illustrative and not in a limiting sense.

What is claimed is:

1. Apparatus for retrieving one or a selected combination of superimposed images from a single composite record containing a plurality of additively superimposed component images each characterizing a different object respectively multiplied with a spatial carrier of unique azimuthal orientation, comprising:

a film gate for supporting said record on an optical axis;

light source means for illuminating said record with a light beam, and lens means for forming in a Fourier transform space a diffraction pattern of the record comprising a plurality of Dirac delta function arrays each convolved with a spectrum of spatial frequencies characterizing a different one of said component record images, said light beam having sufficient spatial coherence to effect substantial separation in said Fourier transform space of diffraction spectra associated with different component record images; and detection means for selectively and simultaneously transmitting at least a portion of each of a predetermined plurality of said diffraction spectra characterizing different ones of said component record images such that the selectively passed spectra may be reconstructed as an overlay of selected component record images, said detection means comprising:

a plurality of adjustable spatial filter means, one for each of said diffraction spectra associated with said different component images, said spatial filter means including a solenoid connected to a radially reciprocable light-blocking member movable into and out of registration with said diffraction spectra, and manually operable means for selectively energizing said solenoids to effect retrieval of said selected component record images.

* * * * *